United States Patent
Jiang et al.

(10) Patent No.: US 9,863,773 B2
(45) Date of Patent: Jan. 9, 2018

(54) INDOOR GLOBAL POSITIONING SYSTEM

(71) Applicant: Samsung Electronics Co., Ltd., Suwon-si, Gyeonggi-do (KR)

(72) Inventors: Yifei Jiang, Santa Clara, CA (US); Jun Yang, Milpitas, CA (US); Vijay Srinivasan, San Jose, CA (US); Shalinder S. Sidhu, Saratoga, CA (US); Danny R. Bennett, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 14/574,194

(22) Filed: Dec. 17, 2014

(65) Prior Publication Data

US 2015/0309180 A1 Oct. 29, 2015

Related U.S. Application Data

(60) Provisional application No. 61/985,669, filed on Apr. 29, 2014, provisional application No. 62/043,934, filed on Aug. 29, 2014.

(51) Int. Cl.
*G01S 5/02* (2010.01)
*G01C 21/20* (2006.01)

(52) U.S. Cl.
CPC .......... *G01C 21/206* (2013.01); *G01S 5/0252* (2013.01)

(58) Field of Classification Search
CPC .............................. G01S 21/206; G01C 5/0252
USPC ....................................................... 701/468
See application file for complete search history.

(56) References Cited

U.S. PATENT DOCUMENTS

| | | | |
|---|---|---|---|
| 7,403,762 | B2 | 7/2008 | Morgan et al. |
| 7,471,954 | B2 | 12/2008 | Brachet et al. |
| 8,054,219 | B2 | 11/2011 | Alizadeh-Shabdiz |
| 8,320,939 | B1 | 11/2012 | Vincent |
| 8,339,316 | B1 | 12/2012 | Mendis |
| 8,370,629 | B1 | 2/2013 | Ngo et al. |
| 8,472,980 | B2 | 6/2013 | Khorashadi et al. |
| 8,543,143 | B2 | 9/2013 | Chandra et al. |
| 8,565,783 | B2 | 11/2013 | Yang et al. |
| 8,589,318 | B2 | 11/2013 | Sundararajan et al. |
| 8,626,198 | B2 | 1/2014 | Das et al. |
| 8,681,741 | B1 | 3/2014 | Ngo et al. |
| 2006/0046709 | A1 | 3/2006 | Krumm et al. |
| 2009/0046005 | A1 | 2/2009 | Namineni et al. |

(Continued)

OTHER PUBLICATIONS

Agarwal et al., "Algorithms for GPS operation indoors and downtown", Springer-Verlag, Nov. 13, 2002.

(Continued)

*Primary Examiner* — Adam D Tissot
(74) *Attorney, Agent, or Firm* — Beyer Law Group LLP

(57) ABSTRACT

In one aspect, information of multiple anchor points is received and stored. The information of each anchor point includes Global Positioning System (GPS) data of a particular location and radio frequency (RF) data that was obtained at a device at the particular location. A geo coordinate is determined for an indoor location based on the RF data obtained at the indoor location and the information of the anchor points. Various embodiments pertain to software, systems, devices and methods relating to anchor points and/or the obtaining of a geo coordinate for a location.

20 Claims, 12 Drawing Sheets

(56) References Cited

U.S. PATENT DOCUMENTS

| | | |
|---|---|---|
| 2010/0198814 A1 | 8/2010 | Petersen et al. |
| 2011/0071759 A1 | 3/2011 | Pande et al. |
| 2011/0086646 A1 | 4/2011 | Gupta et al. |
| 2011/0151898 A1 | 6/2011 | Chandra et al. |
| 2011/0163914 A1 | 7/2011 | Seymour |
| 2011/0221635 A1* | 9/2011 | Wang .................... 342/463 |
| 2011/0285591 A1 | 11/2011 | Wong |
| 2011/0313779 A1 | 12/2011 | Herzog et al. |
| 2012/0021762 A1 | 1/2012 | Garin et al. |
| 2012/0102164 A1 | 4/2012 | Grun et al. |
| 2012/0102165 A1 | 4/2012 | Gruen et al. |
| 2012/0130625 A1 | 5/2012 | Srivastava |
| 2012/0130762 A1 | 5/2012 | Gale et al. |
| 2012/0188938 A1 | 6/2012 | Venkatraman et al. |
| 2012/0182933 A1 | 7/2012 | Bandhakavi et al. |
| 2012/0184292 A1 | 7/2012 | Lin et al. |
| 2012/0185458 A1 | 7/2012 | Liu et al. |
| 2012/0274509 A1 | 11/2012 | Tsai et al. |
| 2012/0294532 A1 | 11/2012 | Morris |
| 2012/0303556 A1 | 11/2012 | Lin et al. |
| 2013/0084882 A1 | 4/2013 | Khorashadi et al. |
| 2013/0084891 A1 | 4/2013 | Khorashadi et al. |
| 2013/0122935 A1 | 5/2013 | Das et al. |
| 2013/0157638 A1 | 6/2013 | Malmbak et al. |
| 2013/0201365 A1 | 8/2013 | Wirola et al. |
| 2013/0204652 A1 | 8/2013 | Marins et al. |
| 2013/0222369 A1 | 8/2013 | Huston et al. |
| 2013/0023282 A1 | 10/2013 | Lin et al. |
| 2013/0317944 A1 | 11/2013 | Huang et al. |
| 2013/0336138 A1 | 12/2013 | Venkatraman et al. |
| 2014/0011518 A1 | 1/2014 | Valaee et al. |
| 2014/0073363 A1 | 3/2014 | Tidd et al. |
| 2014/0088864 A1 | 3/2014 | LaMarca et al. |

OTHER PUBLICATIONS

Drira, Anis, "GPS Navigation for Outdoor and Indoor Environments", The University of Tennessee, Knoxville, May 2006.
Hightower, Jeff, "Mobile Location Technologies", Intel Labs, 2011.
International Search Report dated Jul. 15, 2015 from International Application No. PCT/KR2015/004357.

* cited by examiner

INDOOR GLOBAL POSITIONING SYSTEM

CROSS-REFERENCE TO RELATED APPLICATIONS

This application claims priority of U.S. Provisional Patent Application No. 61/985,669 filed Apr. 29, 2014 and U.S. Provisional Patent Application No. 62/043,934 filed Aug. 29, 2014, each of which is incorporated by reference herein in its entirety for all purposes.

FIELD OF THE INVENTION

The present invention relates to a technology for determining a location. More specifically, various embodiments of the present invention relate to determining a geo coordinate for an indoor location.

BACKGROUND OF THE INVENTION

Many modern smartphones and mobile devices can determine their own location using the Global Positioning System (GPS). In a typical implementation, the smartphone receives signals from multiple GPS satellites. The GPS signals help indicate a distance between the smartphone and the satellites. The smartphone then uses the GPS signals to determine its location, which is typically represented as a geo coordinate or GPS coordinate (e.g., a pair of latitude and longitude coordinates.) An advantage of the GPS coordinate system is that it is widely adopted and compatible with a broad array of location-aware applications.

One disadvantage of the GPS system, however, is that it is ineffective or substantially less effective in indoor environments, because the walls and ceilings of a building may block the satellite signals. Thus, there have been various efforts to develop an indoor GPS system.

SUMMARY

In one aspect, a method for determining a geo coordinate for an indoor location will be described. Information of multiple anchor points is received and stored. The information of each anchor point includes Global Positioning System (GPS) data of a particular location and radio frequency (RF) data that was obtained at a (mobile) device at the particular location. A geo coordinate (e.g., a GPS coordinate) is determined for an indoor location based on the RF data obtained at the indoor location and the information of the multiple anchor points.

In various embodiments, the above method is performed to provide new anchor points for multiple indoor locations. These new anchor points are then used to generate still more indoor anchor points. Thus, geo coordinates for multiple indoor locations can be determined, even it is difficult or impossible to directly receive GPS signals from GPS satellites at those locations.

In another aspect, a device will be described. In various embodiments, the device is arranged to regulate or control the obtaining of geo coordinates in order to reduce power consumption. The device can be a mobile phone, a smartwatch, smart glasses, a wearable device, a computer tablet, or any other suitable computing device. The device includes one or more processors and one or more memory units. The memory unit(s) include a computer readable storage medium that includes computer code. When the computer code is executed by the processor(s), the code causes the device to obtain RF data that indicates RF signals received from one or more RF signal transmitting devices (e.g., WiFi access points) in an enclosed space (e.g., such as a building, mall or other structure.) The device then determines whether to obtain a geo coordinate based on the RF data.

In various embodiments, the device is arranged to obtain geo coordinates when conditions are suitable e.g., when the device is at or near the perimeter of the enclosed space, when the device is in a position to receive a GPS signal from a GPS satellite, etc. By way of example, some implementations of the device obtain a geo coordinate only when the device has been in motion for a period of time. This can help prevent the device from obtaining a geo coordinate twice in the same location.

Various other embodiments pertain to devices, software, methods and systems that perform the above operations.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION OF THE PREFERRED EMBODIMENTS

Various embodiments relate to methods, systems and devices for determining a geo coordinate (e.g., a GPS coordinate) for an indoor location or any location where a GPS signal cannot be reliably received. In some implementations, a device collects GPS and radio frequency (e.g., WiFi) signals at various locations around a building or other structure. For each location, a geo coordinate and radio frequency (RF) data are associated to form what is referred to herein as an anchor point. In some implementations, multiple anchor points are collected by one device or crowdsourced from multiple devices. The anchor points are then used to determine the geo coordinate of a location that is inside a building or any (partially) enclosed space. Anchor points that are determined in this manner can then be used to generate additional anchor points that penetrate deeper into the building.

Knowledge of geo coordinates or GPS coordinates for indoor locations is useful for a wide variety of navigation, mapping and localization applications. A geo coordinate is one or more codes, sequences, coordinates, symbols or mechanisms that help identify or point to a particular location. In various implementations, the geo coordinate is part of a larger coordinate/mapping system that maps or covers a target area. For example, latitude-longitude coordinates are part of a geographic coordinate system that covers the entire world. In that system, each specific geo coordinate pinpoints a particular point or location in the world and can be determined based on data received from GPS satellites. The GPS coordinate system is a widely used, reliable system for mapping the relative positions of almost any location, landmark or structure across the globe. Various implementations of the present invention help extend the GPS coordinate system to indoor locations, so that they can be easily integrated into a wide array of new and existing location-aware technologies.

Figure 1:
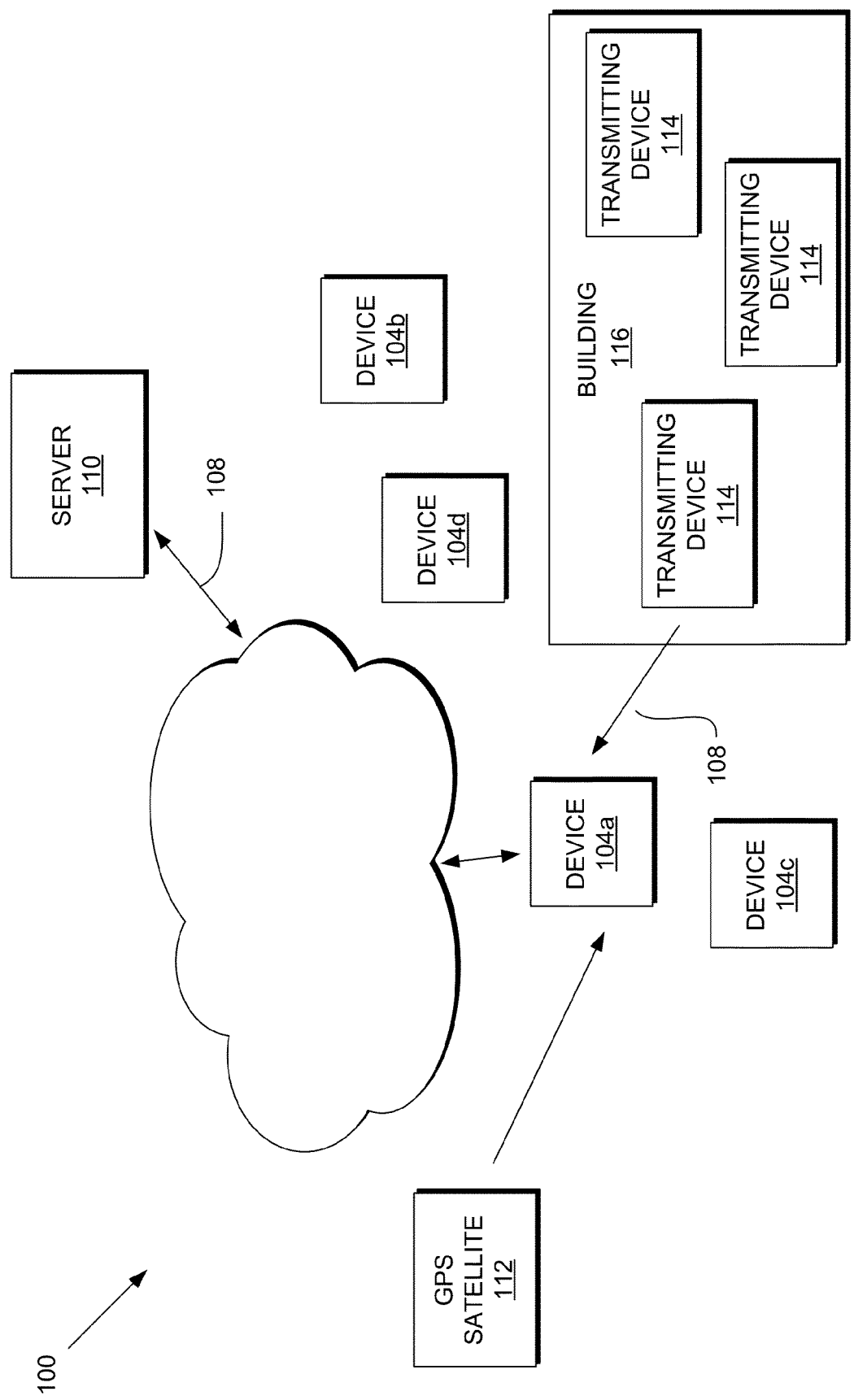
FIG. 1 is a block diagram illustrating a communication system according to a particular embodiment of the present invention.

Referring initially to FIG. 1, a communications system 100 according to a particular embodiment of the present invention will be described. The system includes multiple devices 104a-104d and a server 110. The devices 104a-104d and the server 110 communicate with one another using one or more networks 108. The devices 104a-104d are also configured to receive GPS signals from the GPS satellite 112.

Any suitable network 108 may be used to connect the devices 104a-104d and the server 110. In various embodiments, the network 108 involves but is not limited to a cellular network based on CDMA or GSM, the Internet or any other suitable protocol or any other communication network.

The embodiment illustrated in FIG. 1 depicts the following example scenario. A user of a device 104a is visiting a particular building 116. The device 104a may be any suitable computing device, including but not limited to a smartphone, smart glasses, a smartwatch, a computer tablet and a laptop. The building 116 may be any structure, (partially) enclosed space, or area where it is difficult and/or impossible to receive GPS signals directly from GPS satellites. Generally, this is because the walls and structures of the building block the GPS signals. By way of example, the building 116 may be a mall, a shopping area, an office building or any other suitable structure.

In the building 116 there are multiple radio frequency (RF) signal transmitting devices 114. Each device 114 may be any device suitable for transmitting any known type of RF signal (e.g., Bluetooth, WiFi, etc.) In the illustrated embodiment, for example, the RF signal transmitting devices 114 are WiFi access points. Although only three such devices 114 are shown in FIG. 1, the building may contain dozens or even hundreds of devices 114. A device 104a that is situated within the building 116 or near the building 116 (e.g., immediately outside the building) should be able to receive RF signals from one or more of the transmitting devices 114.

Thus, at certain points near the building 116 (e.g., at or near the boundaries of the building, immediately outside the building, at an indoor location near a window or opening), a device 104a can obtain access both to the RF signals emanating from the building 116 and the GPS signals transmitted from a GPS satellite 112. In various implementations of the present invention, signals received at such locations are used to help determine the geo coordinate of an indoor location within the building, where GPS signals cannot be directly received. This association between RF and a geo coordinate/GPS data for a particular location is referred to herein as an anchor point.

Some implementations involve crowdsourcing techniques. That is, the devices 104a-104d of multiple users automatically transmit anchor points to the server 110 as the users walk around, approach and leave the perimeter of the building 116. The server 110 then uses the anchor points to determine a geo coordinate for a location within the building. Once the geo coordinate is obtained for the indoor location, another anchor point can be formed. That anchor point and other anchor points that are formed in this manner can be used to determine the geo coordinates for yet more indoor locations that possibly penetrate deeper into the building. This process can continue until geo coordinates are known for many or almost all of the locations in the building. Various implementations of the above processes will be described in greater detail below.

Figure 2:
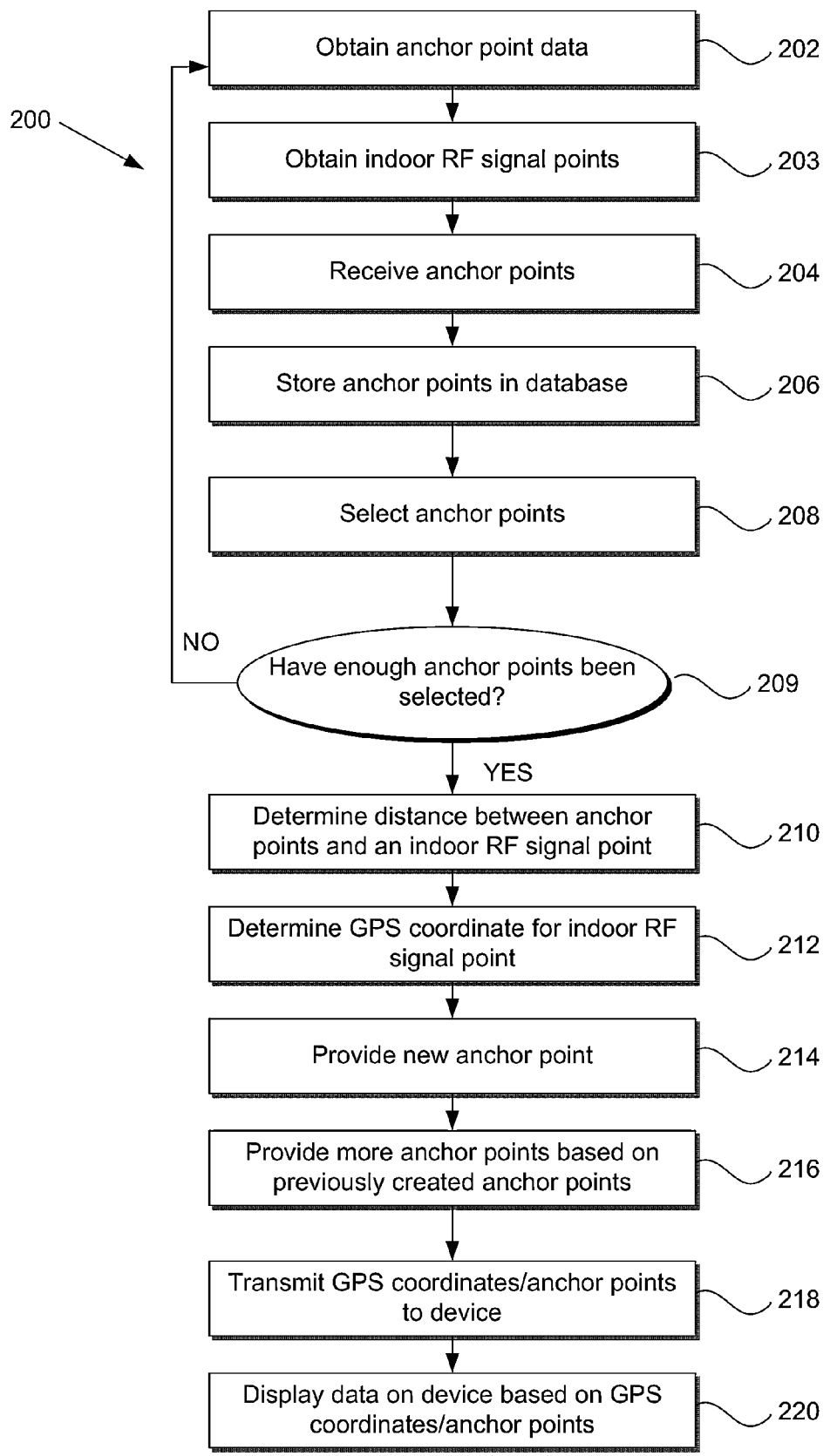
FIG. 2 is a flow diagram of a method for obtaining anchor points and a GPS coordinate according to a particular embodiment of the present invention.

Referring next to FIG. 2, a method for determining a geo coordinate of an indoor location according to a particular embodiment of the present invention will be described. Initially, at step 202, a device 104a obtains anchor point data. As previously discussed, an anchor point involves an association between a geo coordinate/GPS data and radio frequency (RF) data.

Generally, RF data indicates signals received at the device 104a from one or more RF signal transmitting devices 114 (e.g., WiFi access points, Bluetooth signal transmitting devices, etc.) while the device is at a particular associated location. In some embodiments, the RF data indicates the strength of the signals received from each RF signal transmitting device 114 (e.g., a Received Signal Strength Indicator (RSSI) for each RF signal transmitting device whose signal can be received by the device 104a.) The RF data may also individually identify each of these RF signal transmitting devices (e.g., using a MAC address or some other identifier).

Generally, the GPS data includes a geo coordinate or GPS coordinate (e.g., a pair of latitude and longitude coordinates), which indicates the geographic location of the device 104a. In some embodiments, the GPS data also provides a parameter that indicates the reliability or accuracy of the geo coordinate e.g., whether it has a large or small margin of error. In step 202, the device determines the GPS data based on signals received from multiple GPS satellites.

Over time, the device 104a may collect multiple anchor points. That is, as the device 104a arrives at a particular location, associated RF and GPS data is obtained for that location. This process is repeated for multiple other locations as the device 104a moves from place to place. Generally, the device 104a tends to collect more anchor points as it moves around the boundaries or perimeter of the building 116. In such locations, the device is more likely to have access to both RF signals transmitted from within the building 116 as well as access to GPS signals received from GPS satellites. However, in some cases anchor points can also be acquired at locations within the building 116 (e.g., just inside the entrance or exit of the building 116 or near a window.)

At step 203, the device 104a also obtains RF data for indoor RF signal points. RF signal points are associated with locations where GPS signals cannot be directly received from GPS satellites, such as at indoor locations inside the building 116. Each RF signal point is associated with RF data. As discussed above, in various embodiments, the RF data indicates the strength or other characteristics of signals received at the device 104a from one or more RF signal transmitting devices in the building 116 when the device is at the location of the RF signal point. The RF data can also individually identify these transmitting devices e.g., by MAC address or any other suitable identifier.

Figure 5:
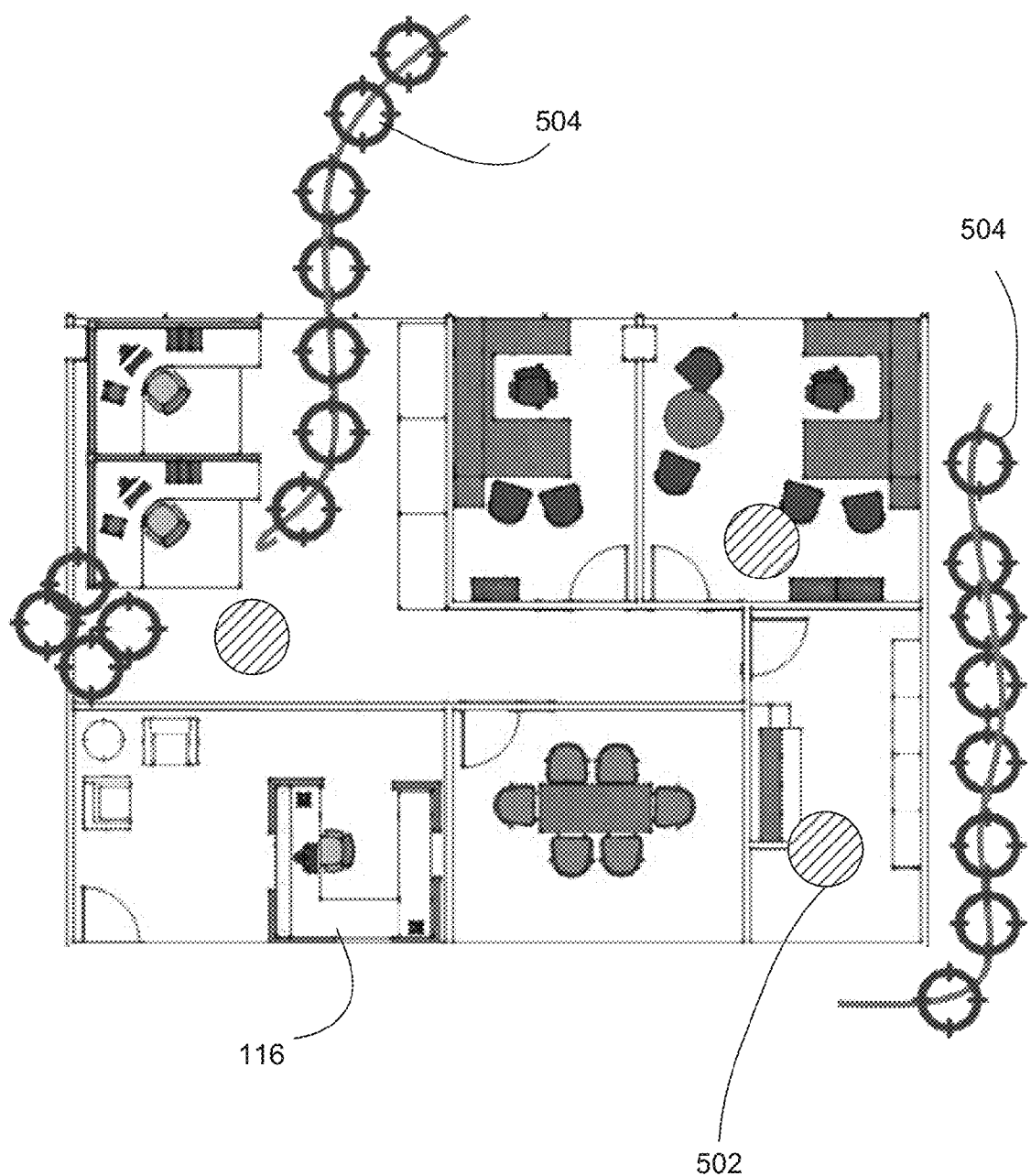
FIG. 5 is a top view of a building and various anchor points according to a particular embodiment of the present invention.

An example of the above operation is illustrated in FIG. 5. FIG. 5 illustrates a building 116, as well as multiple anchor points 504 and indoor RF signal points 502. One or more devices 104a-104d have collected the anchor points 504 near the perimeter of the building 116 or just outside the building 116. As discussed above, each anchor point 504 is associated with a particular location and associates GPS and RF data. At this stage, the anchor points do not extend very far into the building, since in this example, GPS signals are blocked deep within the building.

In the example illustrated in FIG. 5, as the devices 104a-104d traverse the interior of the building, GPS satellite access is lost. However, the devices 104a-104d can still receive RF signals from various RF signal transmitting devices in the building 116. Thus, the devices 104a-104d collect RF data for various locations inside the building 116. The RF data obtained for various indoor locations is represented by the indoor RF signal points 502. As will be discussed later in the application, the anchor points 504 can be used to turn the indoor RF signal points 502 into anchor points as well, which in various embodiments can extend the GPS coordinate system further into the building 116.

Afterward, the devices 104a-104d transmit the indoor RF signal points and anchor points to the server 110. The server 110 receives this data (step 204 of FIG. 2). In various embodiments, the server 110 crowdsources anchor and indoor RF signal points from many devices, which have each performed the aforementioned steps 202 and 203. At step 206, the server 110 stores the crowdsourced anchor points and indoor RF signal points at a database.

The server 110 then begins the process of determining a geo coordinate for a particular indoor RF signal point (e.g., one of the indoor RF signal points 502 of FIG. 5). In preparation for this process, the server 110 selects a subset of the anchor points stored in the database (step 208). This selection can be performed in a wide variety of ways, depending on the needs of a particular application. In various embodiments, for example, the server 110 selects only a subset of anchor points that are sufficiently similar or in close proximity to the target indoor RF signal point. In still other embodiments, the server 110 selects a subset of anchor points based on the number of overlapping RF signal transmitting devices between each anchor point and the indoor RF signal point. Some implementations involve selecting anchor points that spatially surround the indoor RF signal point. Anchor points can also be selected based on the accuracy of their associated GPS data. A more detailed example of the selection process of step 208 will be described later in connection with FIG. 3.

At step 209, a determination is made as to whether there are enough anchor points that meet the criteria of the above selection process. In various embodiments, for example, at least three or four anchor points are needed that meet the above selection criteria. If there are not enough anchor points to determine the geo coordinate of the indoor location, then the method 200 returns to step 202. The method 200 is repeated and more anchor points are generated. Thus, at some point in the future, there may be a sufficient number of anchor points to continue with the method 200. If a sufficient number of anchor points is selected in step 208, then the method proceeds to step 210.

At step 210, once a suitable subset of the anchor points is selected, the server 110 determines a distance between each anchor point and the target indoor RF signal point (step 210). This distance calculation can be performed using any suitable technique. In some embodiments, for example, the distance between each anchor point and the indoor RF signal point is determined based on the similarity of their associated RF data. Any suitable algorithm for determining the similarity of the RF data for each anchor point and the RF data for the indoor RF signal point may be used. For example, one approach would be to use Tanimoto similarity, which can be described as follows:

Assume that A is an anchor point and B is an indoor RF signal point. The RF data for A and B can be characterized as follows:

A={ap1:rss1, ap2:rss2, api:rssi, . . . }
B={ap1:rss1, ap2:rss2, apj:rssj, . . . } where ap1 . . . api and ap1 . . . apj represent WiFi access points within the building 116 that are transmitting WiFi signals. RSS1 . . . RSSi and RSS1 . . . RSSj represent the corresponding strength of signals received at the device 104a from ap1 . . . api and ap1 . . . apj when the device 104a was at A and B, respectively. (Although for the purpose of this example, WiFi access points and WiFi signals are used, it should be appreciated that any suitable RF signal transmitting device or RF signal may be used as well.)

The Tanimoto similarity of A and B can be calculated using the following formula:

$$f(A, B) = \frac{A \cdot B}{|A|^2 + |B|^2 - A \cdot B}$$

To reduce the effects of noise, in some embodiments, the Tanimoto similarity is calculated not just between a particular anchor point and an indoor RF signal point, but instead also takes into account multiple anchor points in close proximity to (e.g., within a predetermined radius of) the anchor point. That is, some implementations involve calculating the Tanimoto similarity not just between A and B, but also between each of $A_1 \ldots A_n$ and B, where $A_1 \ldots A_n$ include A as well as one or more anchor points that are in close proximity to A. The Tanimoto similarities of $A_1 \ldots A_n$ and B are then averaged and used to represent the Tanimoto similarity of A and B.

Once the similarity between each of the selected anchor points and the indoor RF signal point is calculated, each such similarity is converted into a physical distance. This may be performed in various ways. In some embodiments, for example, a general model is used that correlates distance with RF data similarity. The general model can be applied to a wide variety of different buildings and physical environments. In other embodiments, a model is trained for a specific location or particular types of locations. Such a model can thus take into account the specific structure and materials of the building or structure, which can affect signal propagation and the distance calculation. One approach involves receiving RF signals and obtaining RF data (e.g., WiFi fingerprints) at multiple locations within a building. The RF data can then be used to generate a model that correlates physical distance with RF data similarity.

Figure 6:
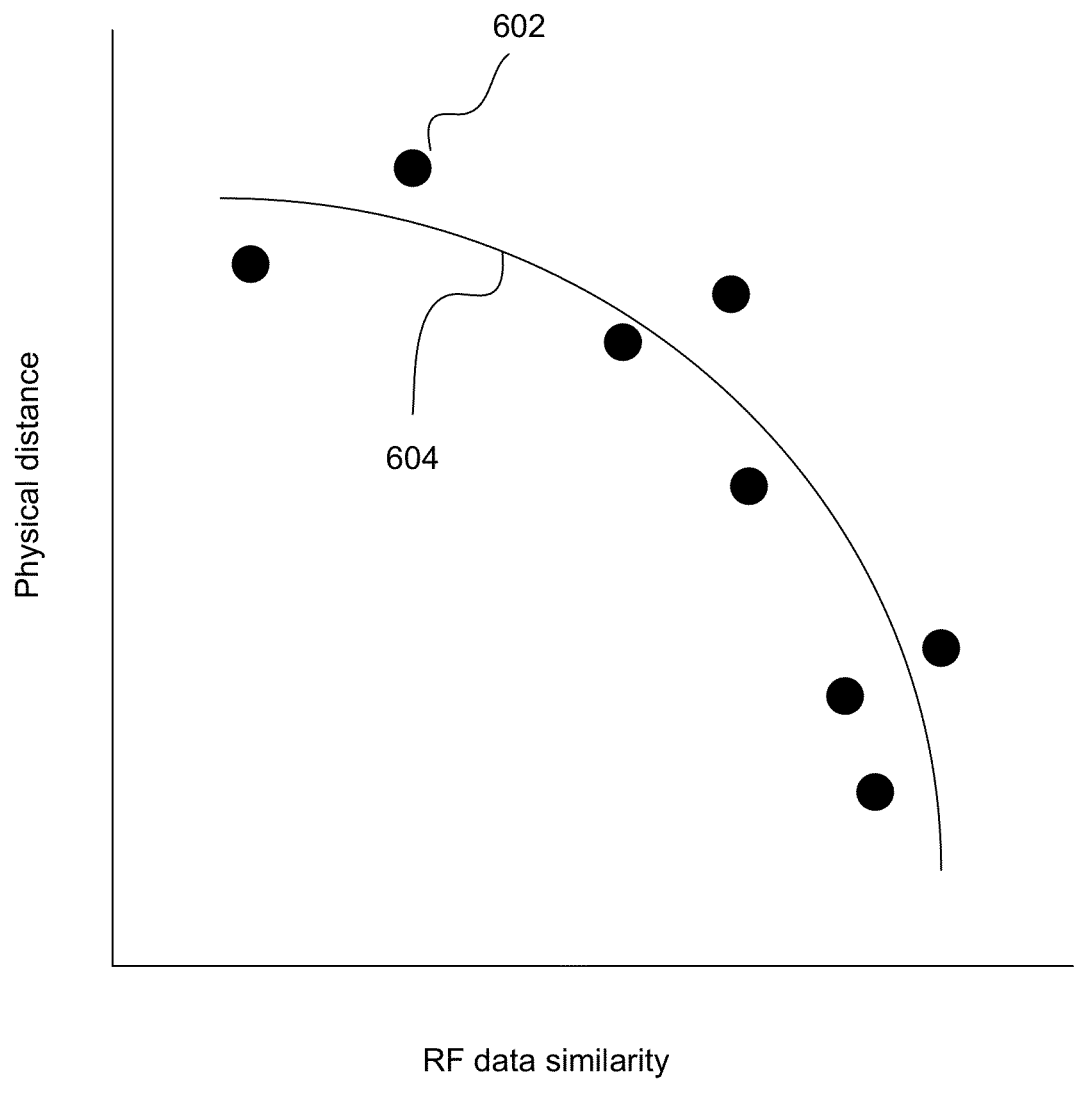
FIG. 6 is a graph illustrating a relationship between RF data similarity and physical distance according to a particular embodiment of the present invention.

A simplified example of such a model is illustrated in FIG. 6. FIG. 6 illustrates a graph that indicates physical distance as a function of RF (e.g., WiFi) data similarity (e.g., the Tanimoto similarity described above.) Each data point 602 in the graph represents the result of a training operation at the building 116. A typical test may be performed as follows. A device (e.g., device 104a) is used to receive RF signals and obtain RF data at two distinct locations within the test building. The Tanimoto similarity between the RF data obtained at the two locations is calculated. The physical distance between the two locations is measured. This data is then used to form one of the data points 602 in the graph. This process is repeated for multiple locations and RF data similarities to form multiple data points 602 in the graph. The data points 602 can then be extrapolated into a curve, as shown by curve 604 in FIG. 6. The curve 604 can be used to convert almost any RF data similarity into physical distance. It should be appreciated that the above technique represents only one approach for converting RF data similarity into physical distance, and any suitable algorithm or model may be used.

Figure 7:
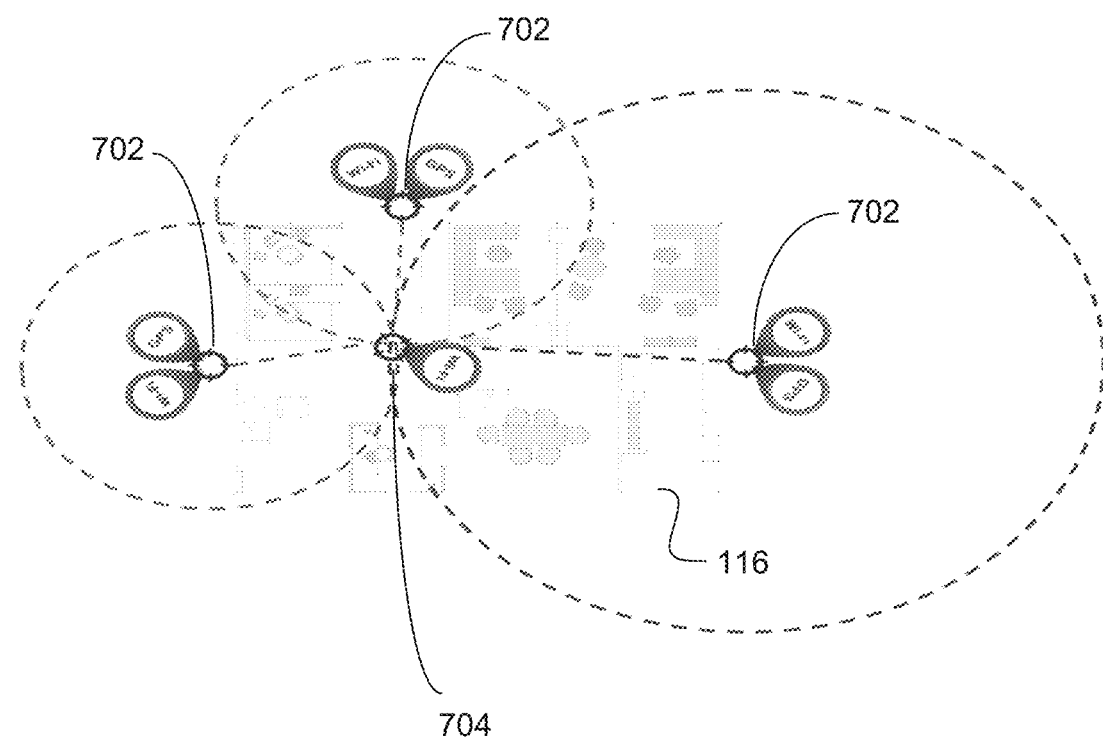
FIG. 7 is a diagram illustrating how anchor points can be used to determine a GPS coordinate of an indoor location according to a particular embodiment of the present invention.

Returning to FIG. 2, once the distance between each selected anchor point and the indoor RF signal point is determined (step 210), the server determines a geo coordinate for the indoor RF signal point (step 212). Any suitable technique may be used to determine the geo coordinate. In some implementations, for example, triangulation is used to determine the geo coordinate. An example of such an approach is illustrated in FIG. 7. FIG. 7 illustrates three example anchor points 702 that are situated at the perimeter of a building 116. A reference circle is drawn around each anchor point 702. The radius of each reference circle is the distance calculated in step 210 (i.e., the physical distance between each anchor point and the indoor RF signal point 704.) The location of the indoor RF signal point 704 is thus the intersection point of the circles. The server 110 then determines a new geo coordinate for the indoor RF signal point 704 based on the triangulated location of the indoor RF signal point 704 and the known geo coordinates of the anchor points 702. In this example, the new geo coordinate indicates the geographical location of the indoor RF signal point 704 using the GPS coordinate system.

It should be appreciated that the aforementioned triangulation may be implemented in any suitable manner utilizing any known triangulation algorithm or technique (e.g., least square, etc.) Some approaches, for example, may leverage the distances between anchor points and the indoor location to estimate a geo coordinate for the indoor location. Other approaches may leverage the angles between anchor points and the indoor location to estimate the geo coordinate for the indoor location. Any suitable triangulation or non-triangulation technique may be used to determine the geo coordinate for an indoor location.

Returning to FIG. 2, once the geo coordinate for the indoor RF signal point is known, a new anchor point can be provided (step 214). That is, the new geo coordinate and the RF data for the indoor RF signal point can be associated to form a new indoor anchor point. Steps 202, 203, 204, 206, 208, 210, 212 and 214 can be repeated multiple times to form multiple indoor anchor points, based on anchor points that are situated near or at the periphery of the building. Steps 208, 210, 212 and 214 can be repeated again to form still more indoor anchor points based on the previously created anchor points (step 216). In this way, the server 110 can determine geo coordinates for indoor locations that extend deeper into the building, until many or all of the locations of interest in the building are associated with a geo coordinate.

Figure 8:
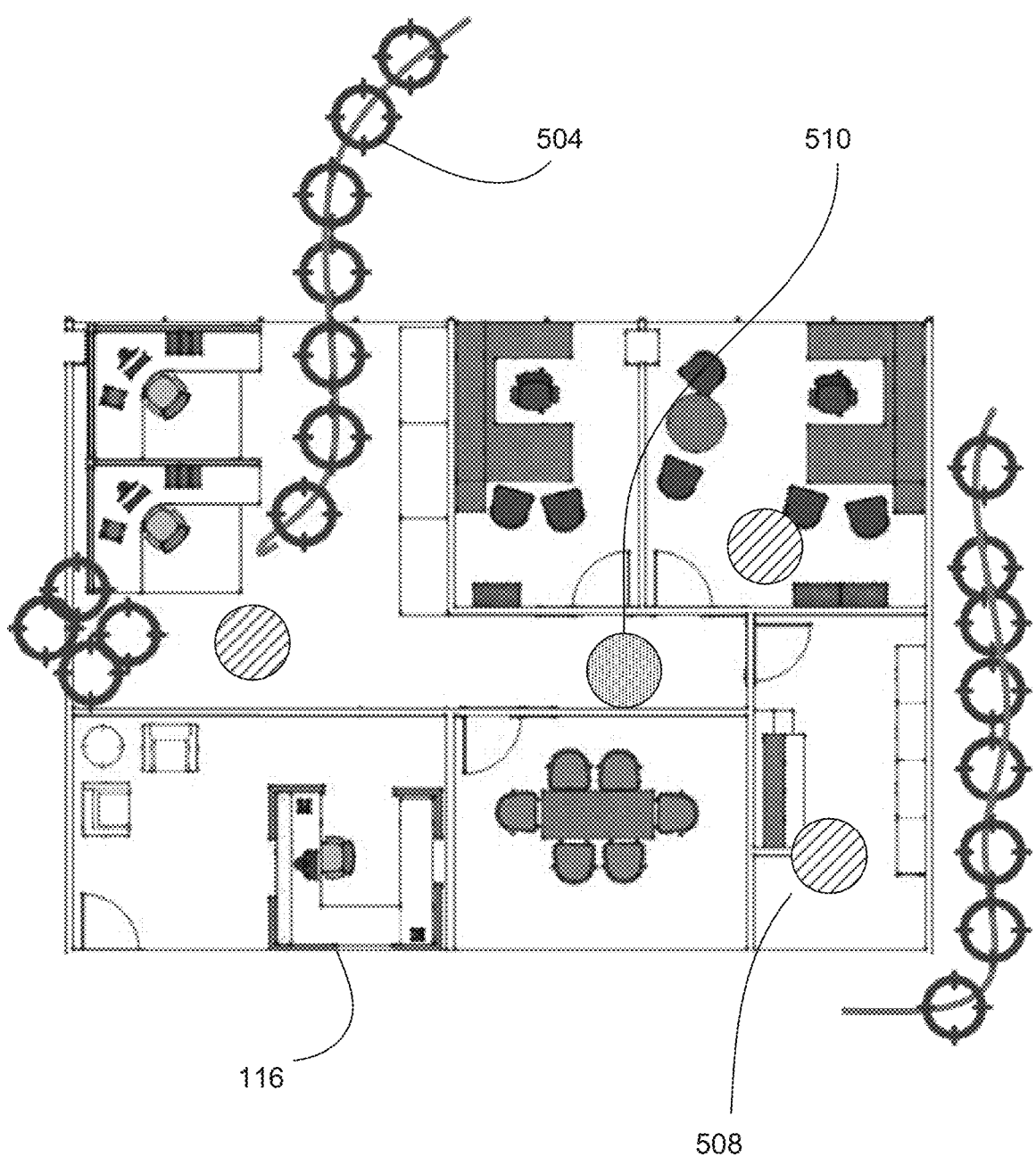
FIG. 8 is a top view of a building and various anchor points according to another embodiment of the present invention.

FIG. 8 illustrates an example of the above process. FIG. 8 illustrates the building 116 and a set of anchor points 504, which were also shown in FIG. 5. As previously discussed, the anchor points 504 were generated using steps 202, 203 and 204 of FIG. 2. That is, in this example the anchor points 504 are generally situated outside and/or near the periphery of the building, at locations where a GPS signal can still be directly received from a GPS satellite.

The anchor points 504 were then used to generate additional anchor points 508 (e.g., using steps 204, 206, 208, 210, 212 and 214 of FIG. 2.) That is, the indoor RF signal points 502 of FIG. 5 were converted into anchor points 508. These anchor points 508 are then used in turn to form still another anchor point 510, which is situated deeper within the building 116 (e.g., using steps 208, 210, 212 and 214.)

Returning to FIG. 2, at step 218, the server 110 transmits anchor points and/or geo coordinates for one or more indoor locations to the device 104a. The device 104a may use or display data based on the geo coordinates/anchor points in a wide variety of ways (step 220). In some embodiments, for example, the device 104a displays a map that indicates the position of various indoor locations based on the received geo coordinate(s). Alternatively or additionally, the device 104a can provide directions to a particular indoor location based on the received geo coordinate(s). In still other embodiments, the user interface of the device 104a displays an indication of the location of an indoor area or landmark using the received geo coordinate(s). Some implementations involve a device 104a that displays an alert or generates an audio alert when the device 104a approaches or enters a particular indoor area. Such alerts are triggered based on the geo coordinates received in step 218.

It should be appreciated that the above method 200 of FIG. 2 may be implemented using any suitable RF signal or RF data. In the above description, various implementations that utilize WiFi signals, WiFi data and WiFi access points have been mentioned. However, a wide variety of technologies other than WiFi may also be used. In some embodiments, for example, Bluetooth is used. This may be implemented in a variety of ways.

A simple example of a Bluetooth implementation may be described as follows. A building (e.g., the building 116 of FIG. 1) includes transmitting devices 114 that send Bluetooth signals. Such transmitting devices 114 may be placed in the building 116 for a variety of purposes. In some embodiments, for example, the building 116 is a mall and the transmitting devices 114 are positioned near particular stores, products or other areas of interest. When users approach those areas, the transmitting devices 114 send data to nearby mobile devices carried by the users. Based on the received data, the mobile devices are arranged to display information regarding particular products, sales, events, objects, topics or any other suitable information associated with those areas of interest. Of course, the Bluetooth signal transmitting devices 114 may (instead) provide a variety of other services to customers or shoppers in the mall.

Various implementations of the present invention can make use of such Bluetooth signal transmitting devices. Consider the following example. Users with mobile devices (e.g., devices 104a-104d of FIG. 1) enter a mall. The mall includes multiple Bluetooth signal transmitting devices. In this example, as a user moves around the mall, each mobile device receives signals from one or more of the Bluetooth signal transmitting devices. In various embodiments, the mobile device stores Bluetooth data that is based on these signals e.g., that indicates the strength of the signals and/or identifies the transmitting devices that they were received from. The mobile device uses this Bluetooth data to obtain anchor point data (e.g., as described in connection with steps 202, 204 and 206 of FIG. 2.) The mobile device can also use such data to obtain indoor RF signal points (e.g., step 203 of FIG. 2). Generally, the Bluetooth data can be used in any manner that RF data is used (e.g., as described in connection with any of the steps of methods 200, 300 and 400 of FIGS. 2-4, etc.)

Figure 3:
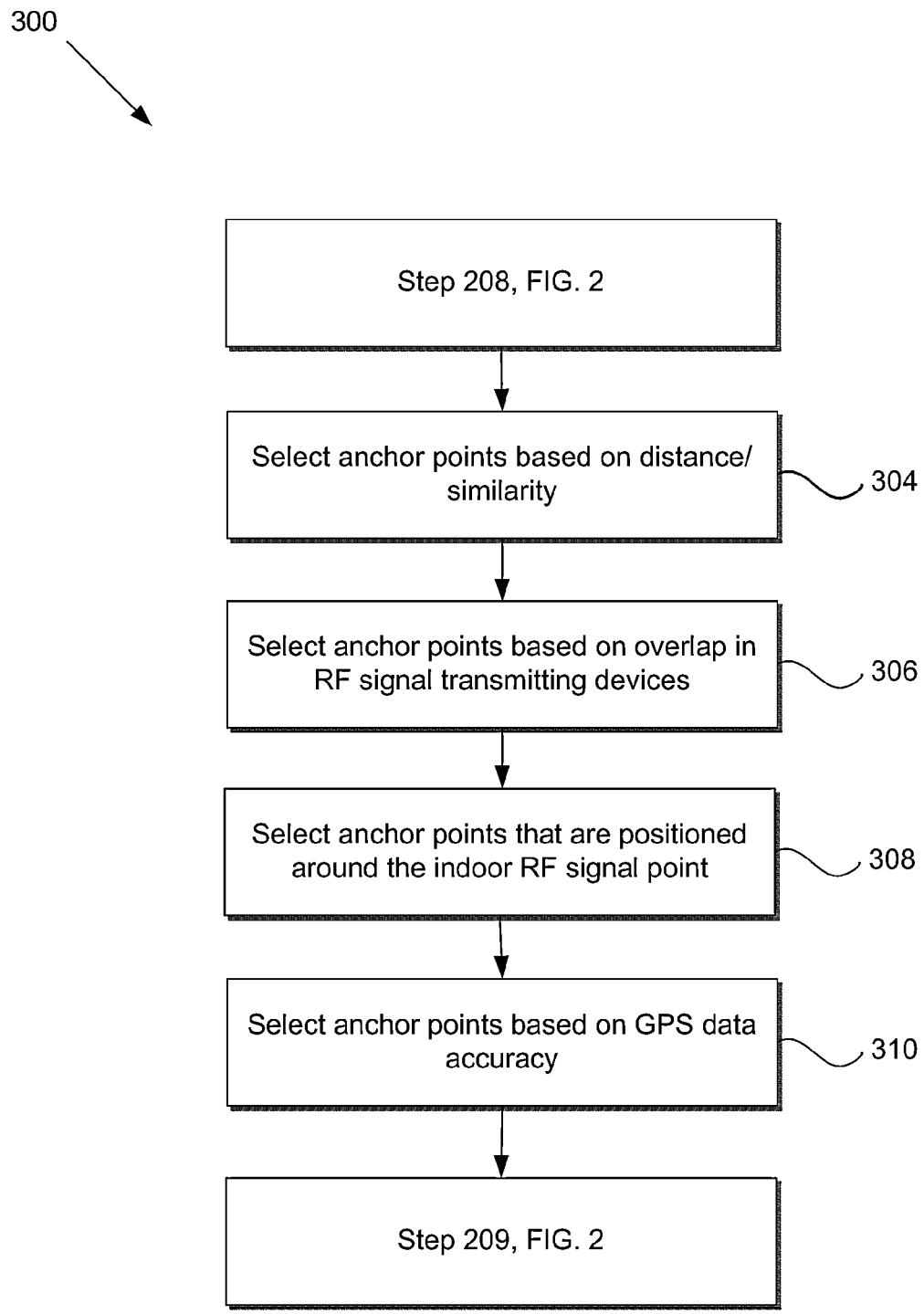
FIG. 3 is a flow diagram of a method for selecting a subset of anchor points according to a particular embodiment of the present invention.

Referring next to FIG. 3, an example method 300 for selecting a subset of anchor points will be described. The method 300 pertains to the selection operation of step 208 of FIG. 2. More specifically, the method 300 helps select a particular subset of anchor points that can be used to help determine a geo coordinate for a particular indoor RF signal point (e.g., the indoor RF signal point 502 of FIG. 5.) In various embodiments, not all of the anchor points are used to help determine the geo coordinate. Rather, some anchor points are selected and/or others are filtered out based on particular criteria. The method 300 describes examples of some possible criteria and selection operations. It should be appreciated that not all of the steps of the method need to be performed and/or the steps may be performed in an order different from what is shown in the figure.

The method begins at step 208 of FIG. 2, which involves selecting a subset of the available anchor points. The method continues to step 304 of FIG. 3, where the server 110 selects anchor points based on their distance or similarity to a particular indoor RF signal point (e.g., indoor RF signal point 502 of FIG. 5.) Generally, it is desirable to select anchor points than are situated closer to the indoor RF signal point. The distance or similarity of each anchor point to the indoor RF signal point may be determined in any suitable manner e.g., Tanimoto similarity, physical distance calculation, etc.

In some implementations, the amount of overlap in RF signal transmitting devices is used as a criteria for selecting anchor points (step 306). That is, as previously discussed in connection with steps 202 and 203 of FIG. 2, the RF data associated with the indoor RF signal point may identify one or more RF signal transmitting devices. The RF data associated with each anchor point also indicates one or more RF signal transmitting devices. Generally, the greater the amount of overlap in RF signal transmitting devices (i.e., the greater the number of RF signal transmitting devices that they share in common), the closer the two points are. In some embodiments, only anchor points that have more than a predetermined amount of overlap in RF signal transmitting devices are used in the next step of method 300. For example, in some applications, an anchor point is only selected if it shares at least two RF signal transmitting devices in common with the indoor RF signal point. Anchor points with insufficient overlap are filtered out and/or are not used in the next step of method 300.

At step 308, the server 110 selects one or more of the remaining anchor points based on their estimated position or arrangement relative to the indoor RF signal point. In various embodiments, for example, there should be at least three anchor points that are spread around the indoor RF signal point and/or are not disproportionately concentrated on one side of the indoor RF signal point. Some implementations involve selecting at least three anchor points that, when connected by reference lines, form a geometric shape that entirely surrounds the indoor RF signal point. In various implementations, the space surrounding the indoor RF signal point is divided into four quadrants that are centered around the indoor RF signal point. The selected anchor points must be distributed in at least three of the quadrants. Other anchor points that do not meet the above spatial criteria are discarded and/or not used in the next step of method 300.

At step 310, the server selects one or more of the remaining anchor points based on GPS signal/data accuracy. Many devices with GPS receivers, such as smartphones running the Android and iOS operating systems, are arranged to indicate the estimated accuracy of any received GPS signal and corresponding geo coordinate. In various embodiments, such accuracy data is also associated with each anchor point. Some implementations involve only selecting those anchor points whose associated GPS accuracy exceeds a predetermined level. In some implementations involving the use of the aforementioned quadrants (e.g., as described in step 308), only the anchor point(s) with the highest GPS accuracy in each quadrant are selected. Other anchor points are discarded and/or not used in the next step of method 300.

In some cases, an inadequate number of anchor points will remain after steps 304, 306, 308 and 310 are applied to filter the available anchor points. By way of example, various implementations require that at least three or four anchor points remain after the criteria of the above steps is applied. If the necessary number of anchor points cannot be found, the method proceeds to step 209 and back to step 202 of FIG. 2, so that additional anchor points can be gathered.

Otherwise, if an adequate number of anchor points has been selected using steps 304, 306, 308 and 310, the selected anchor points are used in steps 209, 210 and 212 of FIG. 2, as appropriate. That is, the selected anchor points are used to determine a geo coordinate for a particular indoor location.

Figure 9A:
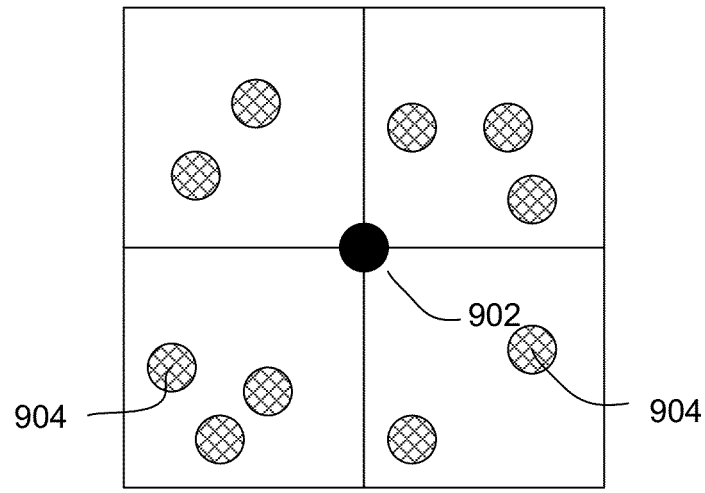
FIGS. 9A-9D are diagrams of anchor points and an indoor RF signal point according to various embodiments of the present invention.
Figure 9B:
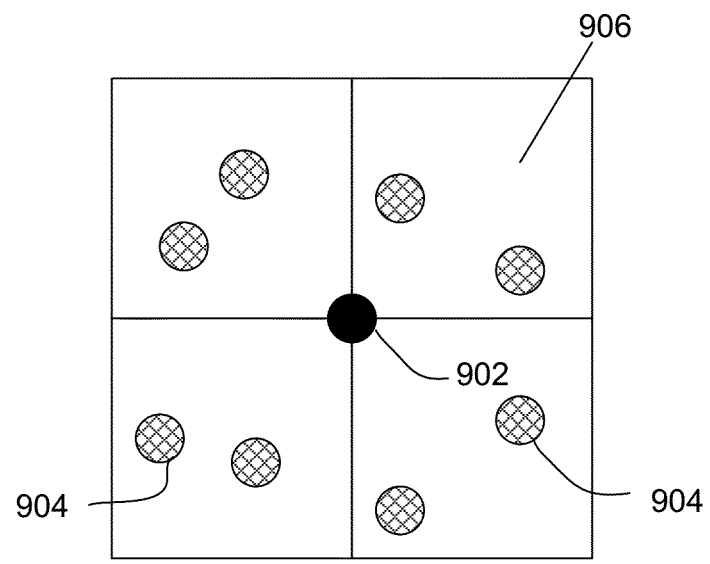
Figure 9C:
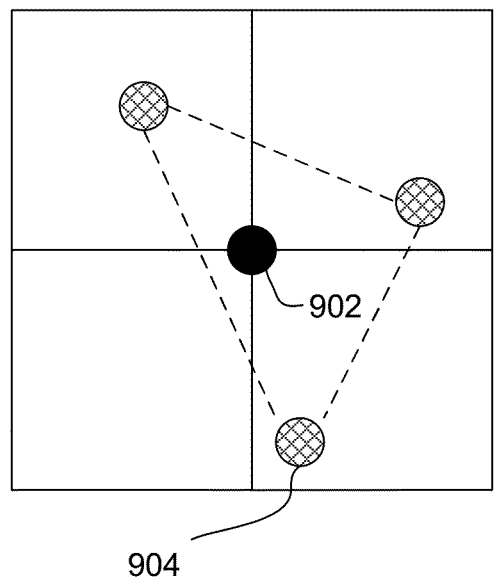

An illustrative example of the above selection process is provided in FIGS. 9A-9C. FIG. 9A is a diagram indicating an indoor RF signal point 902 and multiple anchor points 904. In various embodiments, the anchor points 904 are the anchor points collected from multiple devices and/or stored in the database as described in steps 204 and 206 of FIG. 2.

The server 110 then attempts to determine a geo coordinate for the indoor RF signal point 902. In preparation for this, the server 110 selects a subset of the available anchor points. In this example, the server 110 determines a similarity between each anchor point and the indoor RF signal point (e.g., as discussed in step 304 of FIG. 3.) The server 110 analyzes each anchor point to determine whether there is sufficient overlap in RF signal transmitting devices with the indoor RF signal point (e.g., as discussed in step 306 of FIG. 3). Several anchor points are discarded due to their inability to meet this criteria. That is, each of the discarded anchor points and the indoor RF signal point 902 do not involve or are not associated with a sufficiently large number of the same RF signal transmitting devices (e.g., less than two or three devices in common.) The remaining, unfiltered anchor points are shown in FIG. 9B.

In FIG. 9B, the remaining anchor points 904 are distributed among four reference quadrants 906 that are situated around the indoor RF signal point 902. In this example, the four reference quadrants 906 are rectangular or square in shape and of equal size. The server 110 then selects only the anchor point in each quadrant that has the most accurate GPS signal (e.g., as described in step 310 of FIG. 3.) The other anchor points are discarded, which results in the arrangement illustrated in FIG. 9C.

In FIG. 9C, there is one anchor point remaining in each of three of the quadrants. The server 110 then determines whether the anchor points sufficiently surround the indoor RF signal point 902 (e.g., as described in step 308 of FIG. 3.) For example, one test involves drawing a reference geometric shape by connecting the different anchor points with reference lines. In this example, since the anchor points help form a shape that entirely surrounds the indoor RF signal point, the anchor points are used in later steps of method 200 (e.g., steps 210, 212, 214 and 216 of FIG. 2) to determine a new geo coordinate.

Figure 9D:
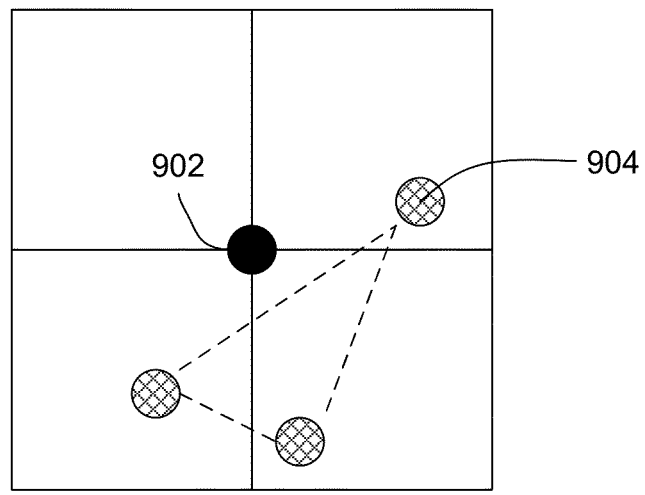

FIG. 9D represents an alternative outcome, in which the application of the aforementioned selection criteria also results in only three anchor points. Additionally, the three anchor points, when joined by reference lines, do not form a geometric shape that surrounds the indoor RF signal point 902, which indicates that they are improperly positioned. In another alternative outcome, the application of the above selection criteria could result in even fewer remaining anchor points (e.g., less than three anchor points), which in some embodiments is considered to be an insufficient basis for determining a new geo coordinate. That is, in some implementations, a geo coordinate for an indoor location is not determined if the number of selected anchor points is less than three, four, or some other predetermined number. In either of the above cases, the method 200 of FIG. 2 then proceeds back to step 202 so that additional anchor points can be obtained.

Figure 4:
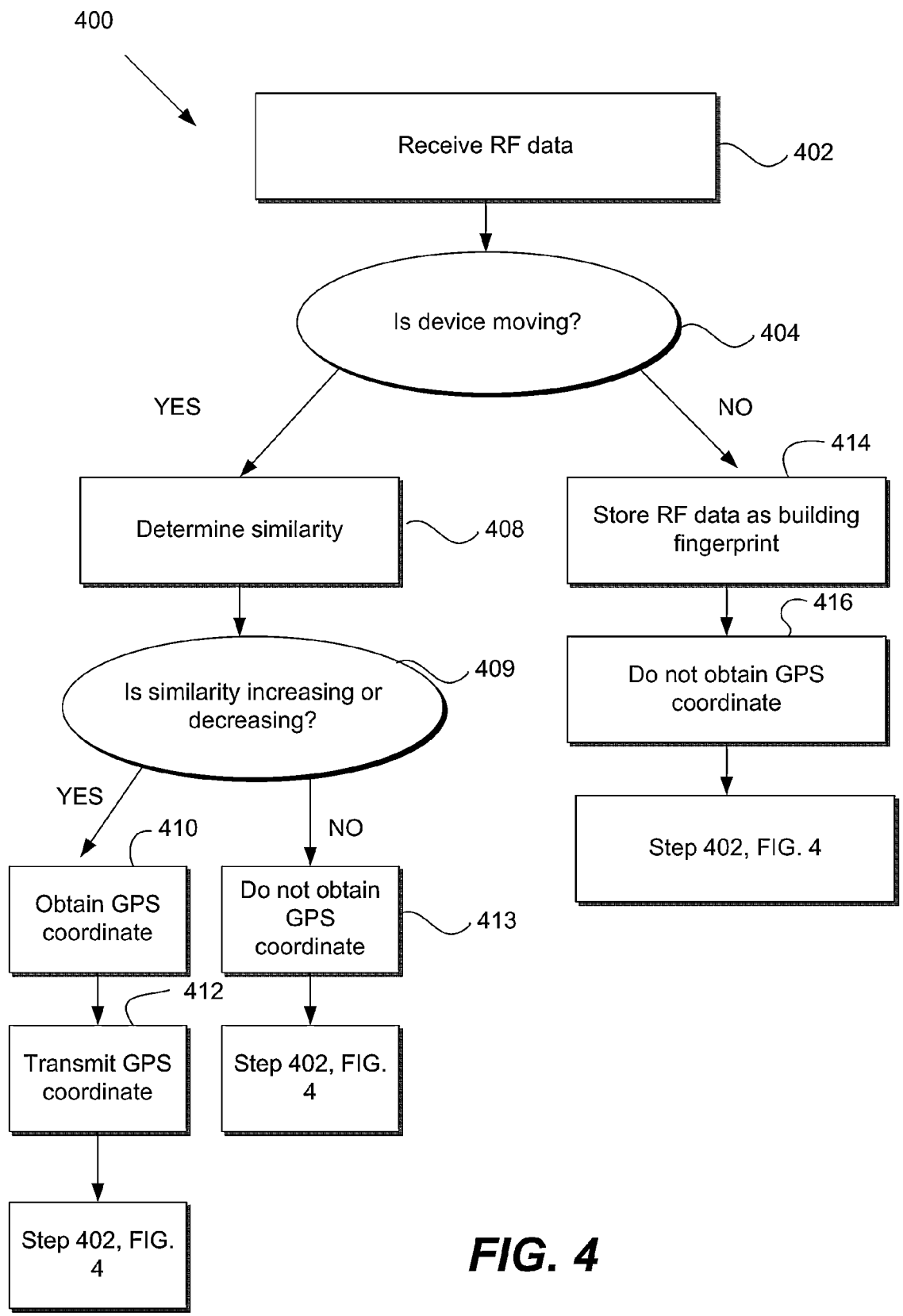
FIG. 4 is a flow diagram of a method for limiting or controlling the obtaining of GPS coordinates according to a particular embodiment of the present invention.

Referring next to FIG. 4, a method 400 for managing the use of GPS at a device 104a according to a particular embodiment of the present invention will be described. In various embodiments, method 400 is performed by a device (e.g., device 104a of FIG. 1) that obtains GPS signals from GPS satellites (e.g., as previously discussed in connection with step 202 of FIG. 2.) The resulting GPS data can be used to form anchor points, which in turn can be used to determine a geo coordinate for an indoor location, as described in method 200 of FIG. 2.

FIG. 4 describes an example method 400 for regulating the obtaining of geo coordinates at the device. Obtaining a geo coordinate can consume substantial amounts of power. For example, in some devices, power must be applied to a GPS antenna so that GPS signals can be received from a GPS satellite. Additional power is required to calculate a geo coordinate based on the received signals. To reduce power consumption, it may be desirable to eliminate redundant requests for the same geo coordinate and/or obtain a geo coordinate only under favorable conditions i.e., when the device is near the perimeter of a building, so that a GPS signal and an anchor point can be obtained. The method 400 provides an example technique for helping to control the obtaining of geo coordinates.

Initially, at step 402 of FIG. 4, the device 104a receives RF data. Generally, this step can be performed in the same or similar manner as described in step 202 of FIG. 2. In various embodiments, RF data is obtained periodically e.g., it is sampled once every 10-40 seconds. The RF data indicates the strength and/or other characteristics of RF signals received at the device 104a from one or more RF signal transmitting devices when the device 104a is at a particular associated location. As the device 104a moves from place to place, RF data is obtained for multiple locations that the device 104a has traversed over time.

At step 404, the device 104a determines whether the device is moving. This determination may be made in any suitable manner. In various implementations, for example, the above RF data is periodically obtained and stored in a buffer. The length of the buffer may be fixed. Thus, when new RF data is placed in a full buffer, old RF data is removed. The buffer effectively stores a recent history of RF data i.e., a history of the strength of signals received from the RF signal transmitting devices over a predetermined period of time.

The determination of whether the device 104a is moving or not can be based on the RF data stored in the buffer. For example, if the RF data is changing in the buffer (i.e., if the strength of the received signals is changing over a predetermined period of time, or if the signals are received from different combinations of RF signal transmitting devices over a period of time, etc.), then it can be assumed that the user is moving. If the received data is not changing over the time period associated with the buffer, then it can be assumed that the user is generally stationary.

It should be appreciated that the movement determination may be performed in other ways as well. In some embodiments, for example, sensor data is used to determine whether the device is moving for a particular time period. That is, data from a motion sensor (e.g., accelerometer) is collected over a period of time and used to determine whether the device was moving during that period.

If the device 104a is determined to have been in motion, then the method proceeds to step 408. If the device 104a is determined to not have been in motion, then the method proceeds to step 414. It should be noted that in some embodiments, the method proceeds to step 408 only when at least a particular amount of motion is detected i.e., when the change in the RF data exceeds a particular threshold or when the sensed motion exceeds a particular threshold. Otherwise, the method proceeds to step 414.

In this example implementation, the device 104a does not obtain GPS signals when the device 104a has not moved for a period of time, because the resulting GPS data may be redundant. That is, it would be identical to a geo coordinate obtained a short while ago at the same location. Eliminating such redundant requests can help reduce power consumption.

If the device is determined not to have been (sufficiently) in motion, the method proceeds to step 414. At step 414, the device 104a stores some or all of the RF data obtained in step 404 (e.g., the RF data most recently stored in the buffer) as a building fingerprint. In various embodiments, this step is performed when the device 104a determines that, during that time, it was at or within the building 116. (Such a determination can be made in any suitable manner. For example, the determination can be based on the fact that GPS signals could not be received recently, due to blockage from building structures; or it can be based on light, sound and magnetic sensors on the device 104a.) As will be discussed below, this building fingerprint will later be used as a reference point to infer the approximate position of the device 104a. At step 416, the devices does not obtain a geo coordinate (e.g., does not apply power to the GPS antenna) for a predetermined period of time. Afterward, the method 400 returns to step 402.

Returning to step 404, if the device 104a is determined to have been (sufficiently) in motion, then the method proceeds to step 408. At step 408, the device 104a determines a similarity between a building fingerprint and recently obtained RF data. The building fingerprint may be, for example, the RF data stored in step 414. The building fingerprint may also be any RF data obtained for a location within the building. The recently obtained RF data may be the data that was most recently stored in the buffer (e.g., as described in step 402). Alternatively, it may be any recently collected RF data (e.g., over the past two minutes, minute, 60 seconds, etc.) The similarity calculation may be performed using any known technique or algorithm. By way of example, in some embodiments, a Tanimoto similarity is calculated between the building fingerprint and the recently obtained RF data (e.g., as described above in connection with step 210 of FIG. 2.)

An example implementation of step 408 may be described as follows. Assume that the most recently obtained RF data includes RFdata1, RFdata2 and RFdata3, where each of RFdata1, RFdata2 and RFdata3 represents RF data sequentially obtained at different times, possibly for differently locations. In some embodiments, RFdata1, RFdata2 and RFdata3 are the RF data that was most recently stored in the aforementioned buffer. The Tanimoto similarity is determined between a building fingerprint (i.e. RF data obtained for a location within the building 116) and each of RFdata1, RFdata2 and RFdata3. As a result, changes in the similarity over time between the building fingerprint and the recently obtained RF data can be observed.

At step 409, a determination is made as to whether the above similarity is increasing or decreasing over time. If it is increasing or decreasing, the method proceeds to step 410. If the similarity is not increasing or decreasing but remains generally constant, then the method proceeds to step 312. Generally, the similarity estimation helps indicate whether the device and its user are moving out of or towards the building 116. It is assumed that if that is occurring, the device 104a may be near the perimeter of the building, where GPS signals and anchor points can be more easily obtained. It should be appreciated that any other suitable algorithm or technique can be used in lieu of the above similarity determination to determine whether GPS signals can be obtained and/or whether the device is near, at and/or just outside the perimeter of the building 116.

If it is determined that the similarity is increasing or decreasing (e.g., if the similarity is increasing or decreasing more than a predetermined amount over a predetermined period of time), the method proceeds to step 410. At step 410, power is consumed as appropriate to obtain a GPS signal from a GPS satellite and to obtain a geo coordinate representing the current location. The method 400 then proceeds to step 202 and/or 204 of FIG. 2, where the geo coordinate is associated with RF data to form an anchor point and transmitted to a server 110.

If it is determined that the similarity is not increasing or decreasing (e.g., if the similarity is not increasing or decreasing more than a predetermined amount over a period of time and/or is substantially constant over the period of time), then the method proceeds to step 413. At step 413, the device does not obtain a geo coordinate for a predetermined period of time. Afterward, the method returns to step 402.

The decision to obtain a GPS signal (e.g., whether to proceed to step 410 or 413) can be based on other factors as well. In some implementations, for example, the decision is based on current location of the device, the battery status of the device, environmental conditions/parameters that are detected or sensed by the device, etc. A device, for example, may tend to lower the frequency with which GPS signals are obtained from a GPS satellite if the battery is low in order to conserve power. Some implementations allow a user to selectively determine or adjust the timing or frequency with which a device obtains GPS signals from a GPS satellite and/or obtains a geo coordinate. In some embodiments, a user can manually adjust settings on the device that control when and under what conditions signals are obtained from a GPS satellite.

Figure 10:
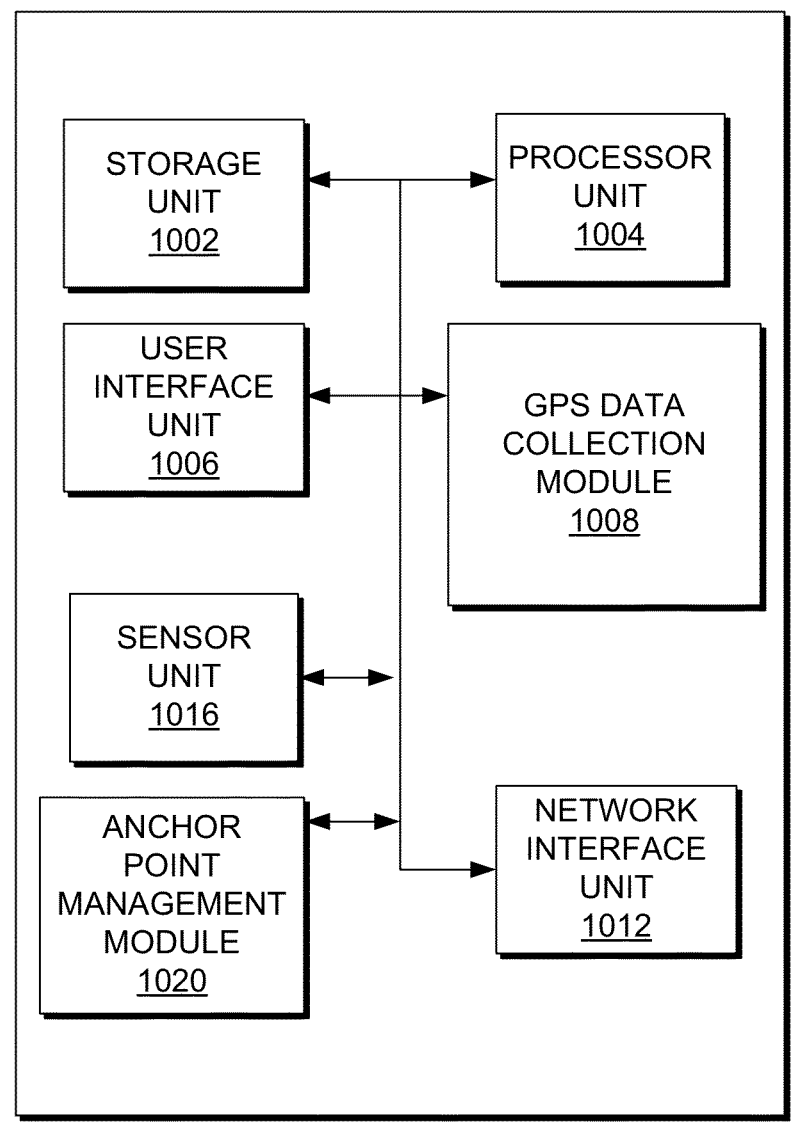
FIG. 10 is a block diagram of a device according to a particular embodiment of the present invention.

Referring next to FIG. 10, a device 104a according to a particular embodiment of the present invention will be described. By way of example, the device 104a may be any of the devices 104a-104d of FIG. 1. The device 104a includes a processor unit 1004 that includes one or more processors, a storage unit 1002, a sensor unit 1016, a user interface unit 1006, a GPS data collection module 1008, an anchor point management module 1020 and a network interface unit 1012. The device 104a may be any suitable computing device, including but not limited to a smartphone, computer tablet, computer glasses, smartwatch and/or any other type of wearable technology.

The network interface unit 1012 includes any hardware or software suitable for enabling the device 104a to communicate with radio frequency signal transmitting devices, WiFi access points, a GPS satellite, the server 110 and any other suitable external devices or networks. For example, the network interface unit 1012 is arranged to receive GPS and RF signals. These signals can be later used to provide anchor points (e.g., as discussed in connection with method 200 of FIG. 2.) The network interface unit 1012 also is used to transmit anchor points (i.e., associated RF and GPS data) to the server 110 for further processing. The network interface unit 1012 is arranged to transmit and receive data using any suitable network (e.g., LAN, Internet, etc.) or communications protocol (e.g., Bluetooth, WiFi, etc.)

The storage unit 1002 is any hardware or suitable for storing data or executable computer code. The storage unit 1102 can include but is not limited to a hard drive, flash drive, non-volatile memory, volatile memory or any other type of computer readable storage medium. Any operation or method for the device 104a that is described in this application (e.g., method 200, 300 and 400 of FIGS. 2-4) may be stored in the form of executable computer code or instructions in the storage unit 1002. The execution of the computer code or instructions by the processor unit 1004 causes the device 104a to perform any of the aforementioned operations or methods.

The sensor unit 1016 includes any hardware or software suitable for sensing temperature, light, sound, magnetic fields, direction, motion, speed or any other suitable environmental parameter. In various embodiments, the sensor unit 1016 includes an accelerometer, a magnetometer, a compass, a temperature sensor, a light sensor, a motion sensor, an audio sensor or any other suitable type of sensor. Various implementations involves using the sensor unit 1016 to collect sensor data, which is used to determine whether the device 104a is in motion (e.g., as described in step 404 of FIG. 4).

The anchor point management module 1020 is any software or hardware configured to help collect, process and/or transmit anchor point-related data. In various embodiments, for example, the anchor point management module 1020 is a software module that is arranged to perform steps 202 and 203 of FIG. 2 and step 402 of FIG. 4. That is, the anchor point management module is arranged to obtain RF signals received from one or more RF signal transmitting devices through the network interface unit 1012. The module 1020 is arranged to use the RF signals to generate RF data. The RF data may indicate characteristics of the signals (e.g., signal strength, identification of each RF signal transmitting device whose signal was received, etc.) that were received at a particular location. The anchor point management module 1020 is further arranged to obtain a geo coordinate for the same location based on GPS signals received from GPS satellites. Some implementations of the module 1020 involve pairing or associating this geo coordinate and RF data to form an anchor point. The module 1020 is arranged to transmit the anchor point to a server 110, and repeats the above operations for multiple other locations. It should be appreciated that in some embodiments, the device 104a and/or the anchor point management module 1020 is not arranged to identify, create or recognize anchor points and/or simply collects anchor point-related data (e.g., geo coordinates, RF data) and transmits it to the server 110.

The GPS data collection module 1008 is any software of hardware configured to help regulate or control the obtaining of geo coordinates. In various embodiments, for example, the GPS data collection module cooperates with the anchor point management module 1020 to help limit the frequency with which geo coordinates are acquired, since such operations can consume large amounts of power. The GPS data collection module 1008 is arranged to perform any of the steps described in method 400 of FIG. 4. In some implementations, the GPS data collection module 1008 is arranged to allow the obtaining of a geo coordinate only when it determines that (1) the device 104a was recently or has been in motion; (2) the device 104a is determined to be in the vicinity of or at the perimeter of a building or an enclosed space; and/or (3) the device is likely to be capable of obtaining a geo coordinate (e.g., when the device is outdoors or at the outskirts of a building.)

The user interface unit 1006 is any hardware or software for presenting an interactive user interface to the user of the device 104a. In various embodiments, the user interface unit includes but is not limited to a touch-sensitive (capacitive) screen, a video display, an e-ink display, an LCD screen, an OLED screen and a heads up display. The user interface 1006 may also be capable of receiving audio commands and making audio statements. The user interface unit is arranged to display a map, directions, a diagram, a guide, or any other application that makes use of or is based on the geo coordinates received from the server 110 (e.g., as described in steps 218 and 220 of FIG. 2) It should be appreciated that the user interface unit 1006 is optional and that in some embodiments, users are not required to input data into the device 104a for new anchor points/GPS coordinates to be obtained (e.g., as described in steps 212, 214 and 216 of FIG. 2).

Figure 11:
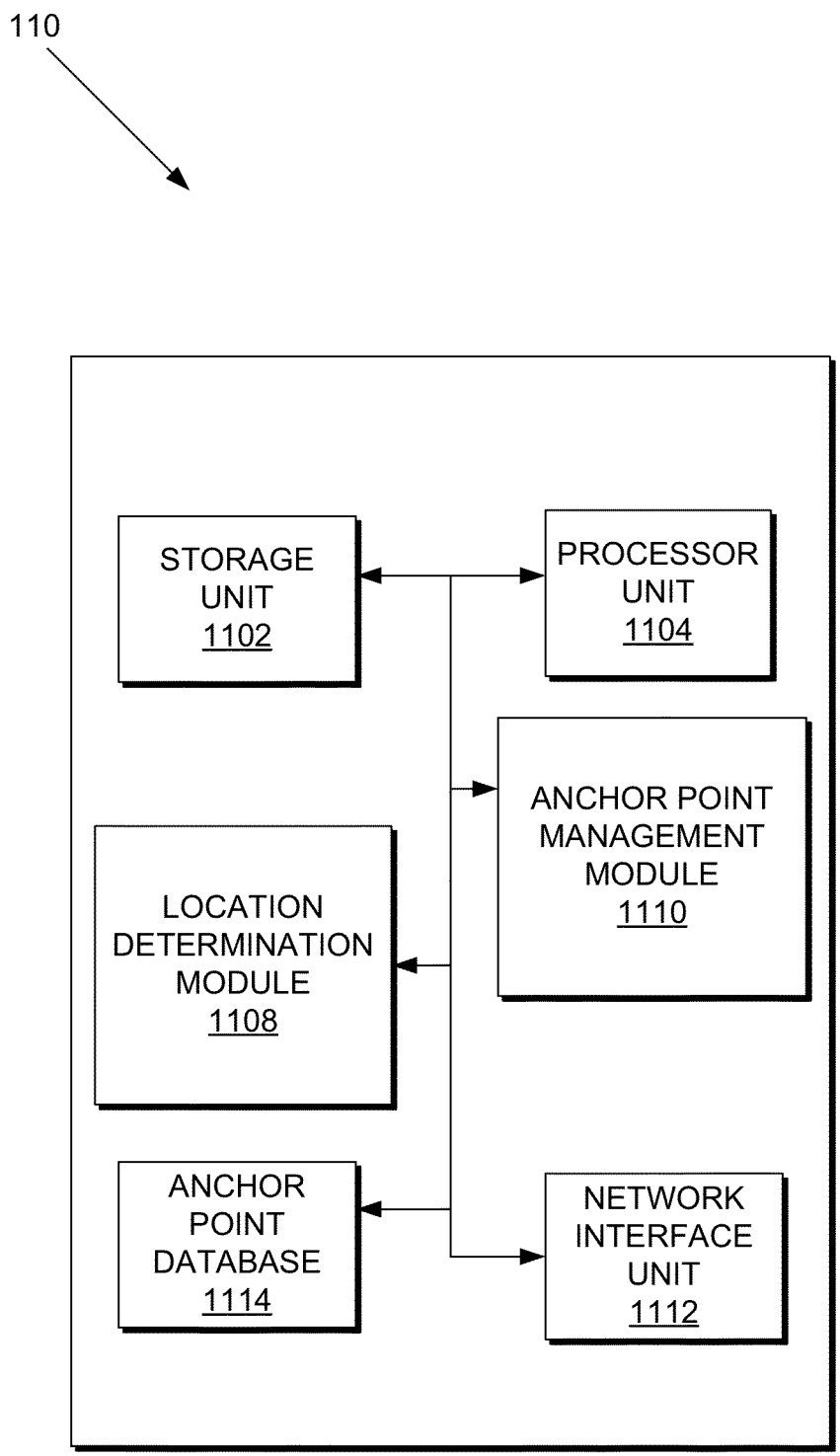
FIG. 11 is a block diagram of a server according to a particular embodiment of the present invention.

Referring next to FIG. 11, a server 110 according to a particular embodiment of the present invention will be described. The server 110 includes a processor unit 1104 that includes one or more processors, a storage unit 1102, an anchor point database 1114, an anchor point management module 1110, and a network interface unit 1112. The server 110 may be, for example, the server 110 illustrated in FIG. 1.

The network interface unit 1112 includes any hardware or software suitable for enabling the server 110 to communicate with the devices 104a-104d. For example, the network interface unit 1112 is arranged to receive GPS data, radio frequency (RF) data, anchor points and any other suitable data from the devices 104a-104d (e.g., as discussed in step 204 of FIG. 2.) This data is then passed on to other components (e.g., the anchor point database 1114, the anchor point management module 1114) in the server 110 for further analysis and processing. The network interface unit 1112 is also used to transmit data (e.g., anchor point data, geo coordinates, as described in steps 218 and 220 of FIG. 2) to the devices 104a-104d. The network interface unit 1112 is arranged to transmit and receive data using any suitable network (e.g., LAN, Internet, etc.) or communications protocol (e.g., Bluetooth, WiFi, etc.)

The storage unit 1102 is any hardware or suitable for storing data or executable computer code. The storage unit 1102 can include but is not limited to a hard drive, flash drive, non-volatile memory, volatile memory or any other type of computer readable storage medium. Any operation or method for the server 110 that is described in this application (e.g., in methods 200 and 400 of FIGS. 2 and 4) may be stored in the form of executable computer code or instructions in the storage unit 1102. The execution of the computer code or instructions by the processor unit 1104 causes the server 110 to perform any of the aforementioned operations or methods.

The anchor point database 1114 is any hardware or software used to store anchor point-related data (e.g., associated RF data and geo coordinates for particular locations) received from multiple devices (e.g., devices 104a-104d.) In some embodiments, the anchor point database 1114 stores numerous anchor points obtained by a large numbers of devices over time. This data may be stored as described in step 206 of FIG. 2.

The anchor point management module 1110 is any software or hardware arranged to use the anchor points stored in the database 1114 to determine geo coordinates for indoor locations. The anchor point management module 1110 can use the geo coordinates to form new indoor anchor points, which can be used in turn to form still more indoor anchor points. The module 1110 is arranged to transmit the above indoor anchor points and/or geo coordinates to the devices 104a-104d, so that they can be utilized by a wide variety of localization, mapping and navigation applications. In various embodiments, the anchor point management module is arranged to perform any server operation described in methods 200 and 400 of FIGS. 2 and 4.

Any of the methods or operations described herein can be stored in a tangible computer readable medium in the form of executable software code. The code can then be executed by one or more processors. The execution of the code causes a corresponding device (e.g., device 104a-104d or server 110) to perform the described operations.

This application describes a variety of methods (e.g., methods 200, 300 and 400 of FIGS. 2, 4, and 4, respectively.) It should be appreciated that these methods represent only example implementations and may be modified as appropriate for a variety of different applications. By way of example, one or more steps of any of the above methods may be removed, replaced, modified and/or reordered.

Although only a few embodiments of the invention have been described in detail, it should be appreciated that the invention may be implemented in many other forms without departing from the spirit or scope of the invention. For example, there are references to an "enclosed space", "building" or "indoor location" in this application. Such terms can refer to any building, space, structure or area that is at least partially covered or enclosed and/or where it is difficult or impossible to receive a GPS signal from GPS satellites. Additionally, there are various references to GPS signals and GPS data in the claims and specification. It should be appreciated that the term "GPS" is not intended to limit the claims and application only to particular implementations of a GPS system, and is intended to be applicable to any suitable (satellite-based) positioning/navigation system, including systems that are not yet in operation e.g., the Compass navigation system, the Galileo positioning system, etc. This application sometimes describes various methods and operations that are performed by a device or a server. In some implementations, however, an operation that is described herein as being performed by a device can instead performed by a server, and vice versa. Generally, any operation or method described herein is not limited to a particular type of device and may be implemented by any suitable device. Therefore, the present embodiments should be considered as illustrative and not restrictive and the invention is not limited to the details given herein, but may be modified within the scope and equivalents of the appended claims.

What is claimed is:

1. A method for determining a geo coordinate for an indoor location, the method comprising:
   receiving and storing information of a plurality of anchor points at a server in at least one memory of the server, wherein the information of each anchor point of the plurality of anchor points includes Global Positioning System (GPS) data of a particular location and radio frequency (RF) data that was obtained at a device at the particular location;
   determining by a processor of the server a first geo coordinate for a first indoor location based on an algorithm or formula for determining similarity between a first RF data obtained at the first indoor location and the information of the plurality of the anchor points in the at least one memory of the server; and
   transmitting the first geo coordinate to a further device, to be used in a navigation application.

2. The method of claim 1 further comprising:
   providing information of a first indoor anchor point wherein the information of the first indoor anchor point includes the first geo coordinate and the first RF data obtained at the first indoor location; and
   determining a second geo coordinate for a second indoor location based at least in part on the information of the first indoor anchor point.

3. The method of claim 2 wherein:
   the second indoor location is located deeper within an enclosed space than the first indoor location.

4. The method of claim 1 wherein:
   the GPS data includes a geo coordinate that indicates a geographical position of the device; and
   the RF data indicates strength of signals received at the device from one or more RF signal transmitting devices.

5. The method of claim 1 further comprising:
   receiving and storing information of a multiplicity of anchor points, wherein the information of each anchor point of the multiplicity of anchor points includes Global Positioning System (GPS) data of a particular location and radio frequency (RF) data that was obtained at a device at the particular location wherein the multiplicity of anchor points includes the plurality of anchor points; and
   selecting the plurality of anchor points from the multiplicity of anchor points.

6. The method of claim 5 further comprising:
   determining a similarity between the RF data of each anchor point of the multiplicity of anchor points and the first RF data obtained for the first indoor location wherein the selection of the plurality of anchor points is based at least in part on the similarity determination.

7. The method of claim 6 wherein:
   the RF data of one of the multiplicity of anchor points indicates that signals were received at the one of the anchor points from a first set of one or more RF signal transmitting devices;
   the first RF data obtained at the first indoor location indicates that signals were received at the first indoor location from a second set of one or more RF signal transmitting devices; and
   the similarity determination involves determining an amount of overlap in RF signal transmitting devices between the first set and the second set.

8. The method of claim 5 wherein:
   the selected plurality of the anchor points includes at least three anchor points;
   the at least three anchor points are selected such that when locations associated with the at least three anchor points are linked by reference lines to form a reference geometric structure, the reference geometric structure surrounds the first indoor location.

9. The method of claim 5 wherein the GPS data of each anchor point of the multiplicity of anchor points indicates an associated geo coordinate and wherein the plurality of the anchor points is selected based at least in part on an estimated accuracy of the geo coordinate associated with each of the multiplicity of anchor points.

10. The method of claim 1 further comprising:
    determining a distance between each anchor point of the plurality of anchor points and the first indoor location wherein the determination of the first geo coordinate is based on the distance determination.

11. The method of claim 1 further comprising:
    using the first geo coordinate in a navigation application.

12. A device operable to determine a geo coordinate for an indoor location, comprising:
    at least one processor; and
    at least one memory including a computer readable storage medium that includes computer code stored in a tangible form wherein the computer code, when executed by the at least one processor, causes the device to:
       receive and store information of a plurality of anchor points, wherein the information of each anchor point of the plurality of anchor points includes Global Positioning System (GPS) data of a particular location and radio frequency (RF) data that was obtained at a device at the particular location; and
       determine a first geo coordinate for a first indoor location based on an algorithm or formula for determining similarity between a first RF data obtained at the first indoor location and the information of the plurality of the anchor points.

13. The device of claim 12 wherein the computer code further causes the device to:
    not obtain a geo coordinate for a period of time when the RF data indicates that the device has been stationary for a period of time.

14. The device of claim 12 wherein the computer code further causes the device to:
    obtain a geo coordinate when the RF data indicates that the device is at least one of 1) moving towards the enclosed space; (2) moving away from the enclosed space; and (3) at a boundary of the enclosed space.

15. The device of claim 12 wherein the computer code further causes the device to:
    compare the RF data with a building fingerprint; and
    obtain a geo coordinate when the comparison indicates that a similarity between the RF data and the building fingerprint is increasing or decreasing.

16. The device of claim 12 wherein:
   the RF data indicates the strength of RF signals received from one or more RF signal transmitting devices; and
   the enclosed space is at least one of a building, a store, a mall, a shopping area, a partially enclosed space and a structure.

17. A computer readable storage medium that includes executable computer code embodied in a tangible form operable to determine a geo coordinate for an indoor location wherein the computer readable storage medium includes:
   executable computer code operable to receive and store information of a plurality of anchor points, wherein the information of each anchor point of the plurality of anchor points includes Global Positioning System (GPS) data of a particular location and radio frequency (RF) data that was obtained at a device at the particular location; and
   executable computer code operable to determine a first geo coordinate for a first indoor location based on an algorithm or formula for determining similarity between a first RF data obtained at the first indoor location and the information of the plurality of the anchor points.

18. The computer readable storage medium of claim 17, further comprising:
   executable computer code operable to provide information of a first indoor anchor point wherein the information of the first indoor anchor point includes the first geo coordinate and the first RF data obtained at the first indoor location; and
   executable computer code operable to determine a second geo coordinate for a second indoor location based at least in part on the information of the first indoor anchor point.

19. The computer readable storage medium of claim 18 wherein:
   the second indoor location is located deeper within an enclosed space than the first indoor location.

20. The computer readable storage medium of claim 17 wherein:
   the GPS data includes a geo coordinate that indicates a geographical position of the device; and
   the RF data indicates strength of signals received at the device from one or more RF signal transmitting devices.

\* \* \* \* \*